(No Model.) 9 Sheets—Sheet 1.
D. KUNHARDT.
AUTOMATIC TELEGRAPH.
No. 457,816. Patented Aug. 18, 1891.
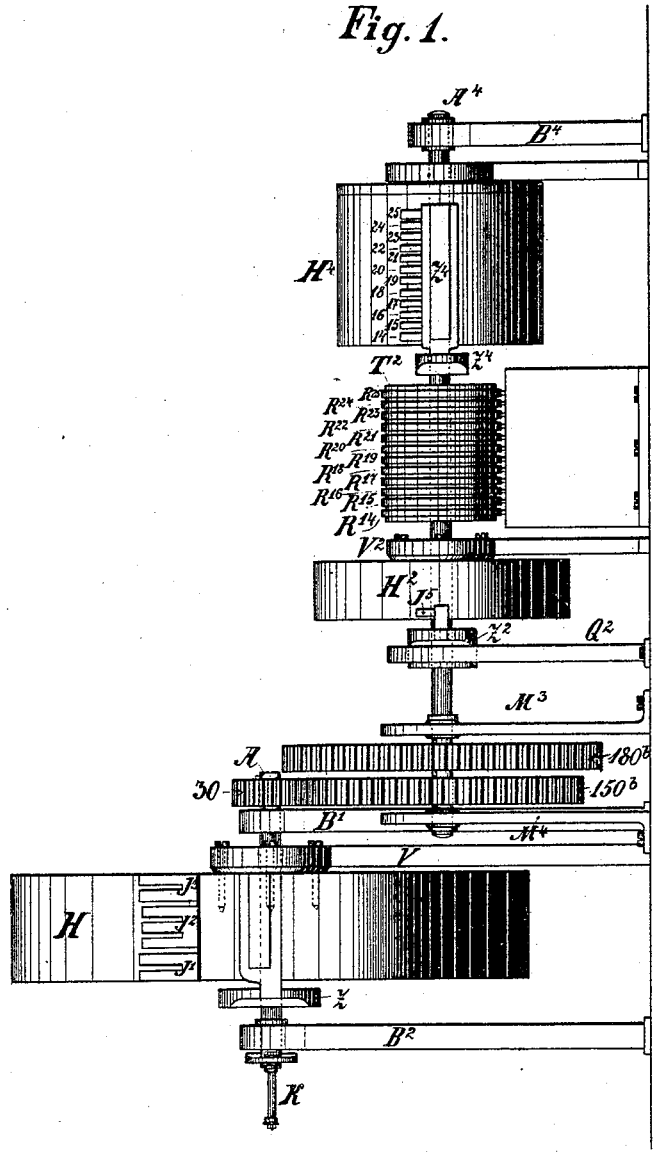

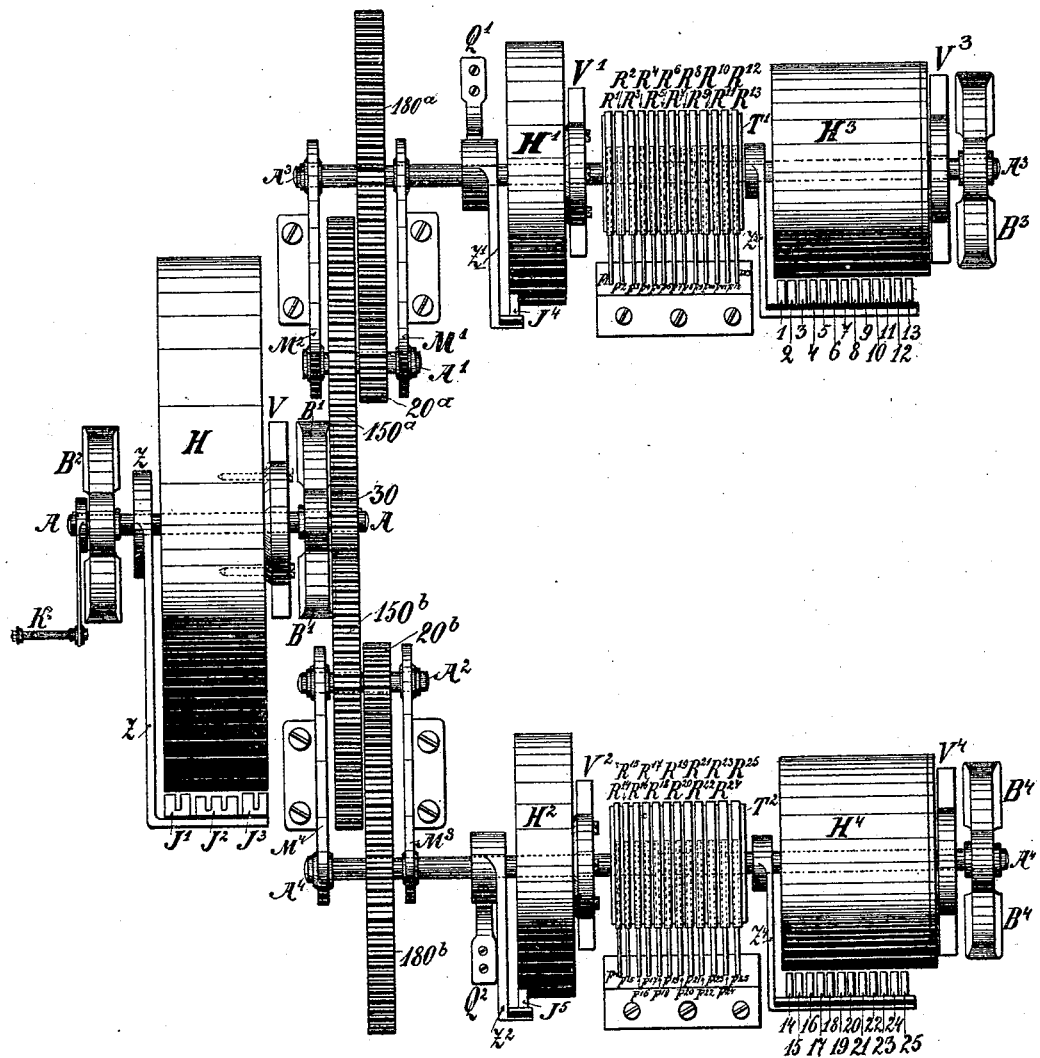

(No Model.) 9 Sheets—Sheet 3.
D. KUNHARDT.
AUTOMATIC TELEGRAPH.
No. 457,816. Patented Aug. 18, 1891.
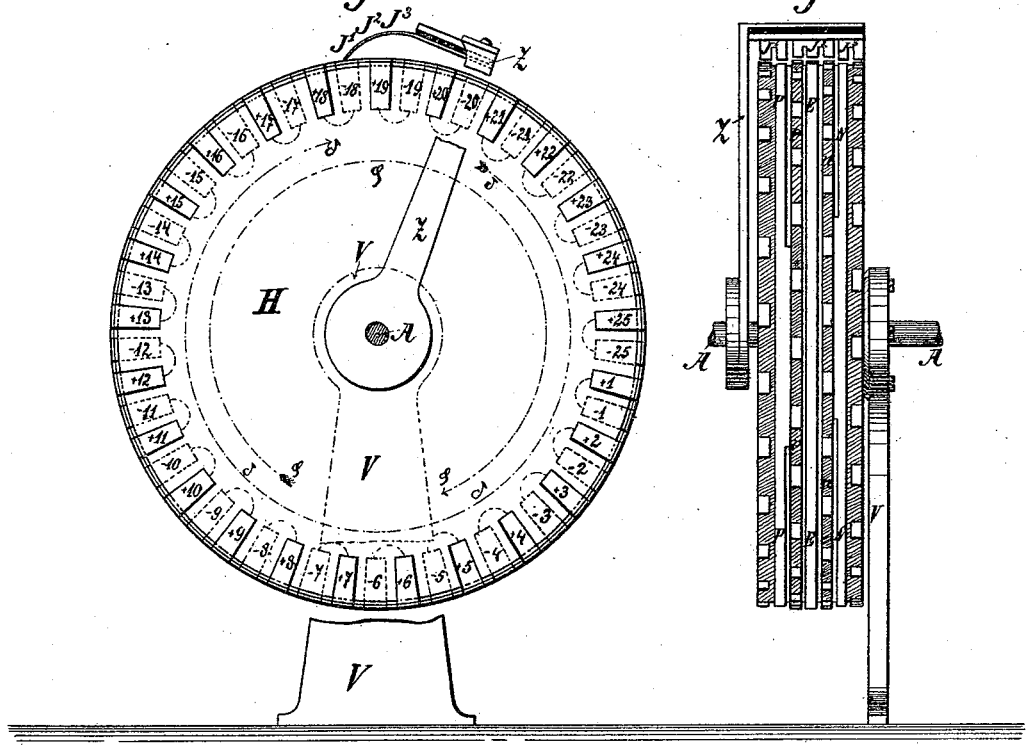
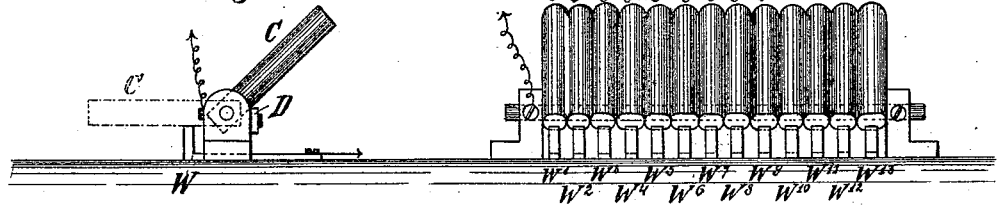
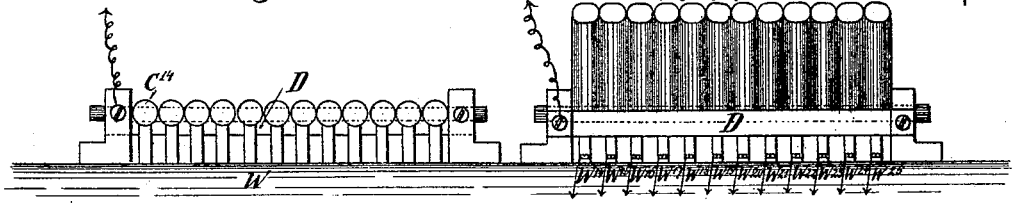
Witnesses:
A. Jonghmans.
Wm Wagner.
Inventor:
D. Kunhardt
by his attorneys
Roeder & Briesen (No Model.) 9 Sheets—Sheet 4.
D. KUNHARDT.
AUTOMATIC TELEGRAPH.
No. 457,816. Patented Aug. 18, 1891.
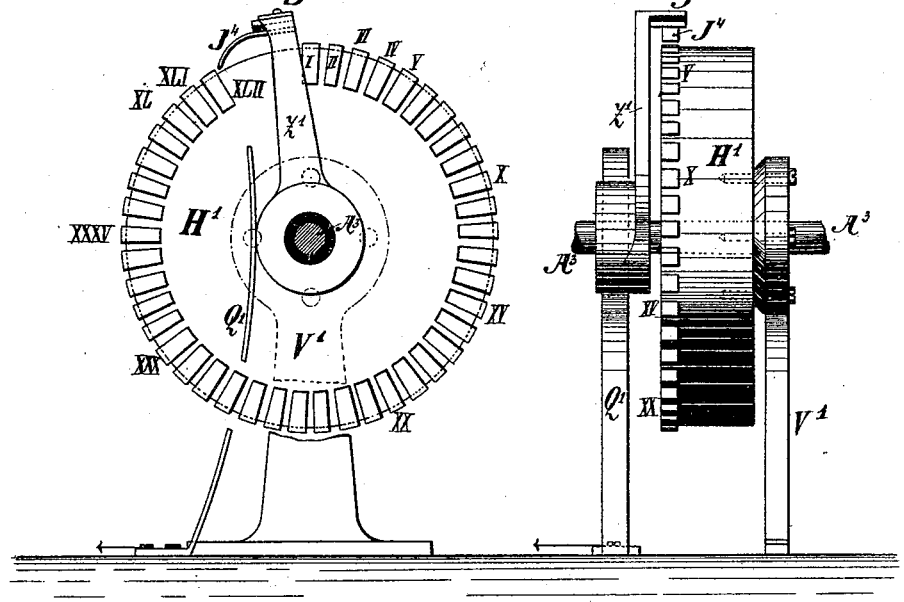

(No Model.) 9 Sheets—Sheet 5.
D. KUNHARDT.
AUTOMATIC TELEGRAPH.
No. 457,816. Patented Aug. 18, 1891.
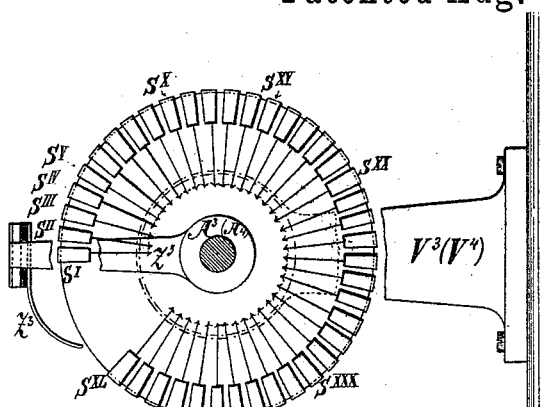
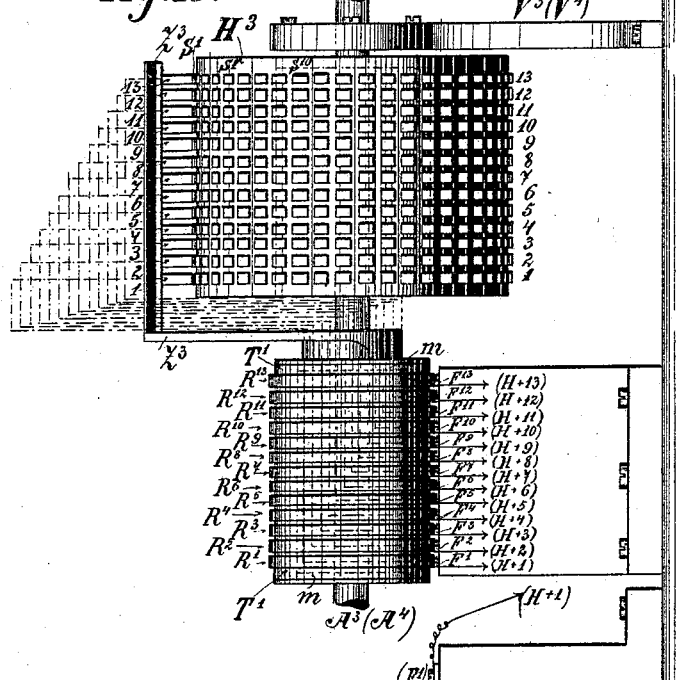
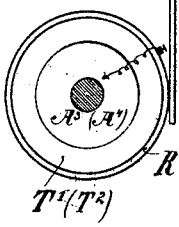

(No Model.) 9 Sheets—Sheet 6.
D. KUNHARDT.
AUTOMATIC TELEGRAPH.
No. 457,816. Patented Aug. 18, 1891.
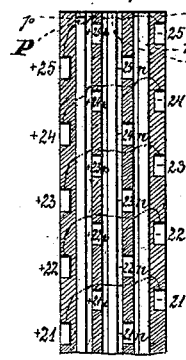
Fig. 16.
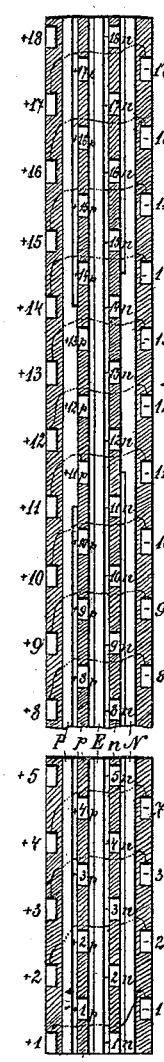
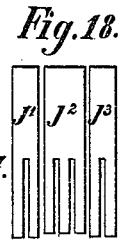
Fig. 17. Fig. 18.
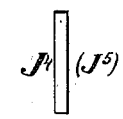
Fig. 22.
Fig. 19. Fig. 20. Fig. 21.
Witnesses:
A. Houghman
Wm. Wagner
Inventor:
D. Kunhardt
by his attorneys
Roeder & Briesen (No Model.)  
9 Sheets—Sheet 7.

D. KUNHARDT.
AUTOMATIC TELEGRAPH.

No. 457,816.  
Patented Aug. 18, 1891.

Witnesses:  
A. Jonghmans  
Wm. Wagner

Inventor:  
D. Kunhardt  
by his attorneys  
Roeder & Briesen

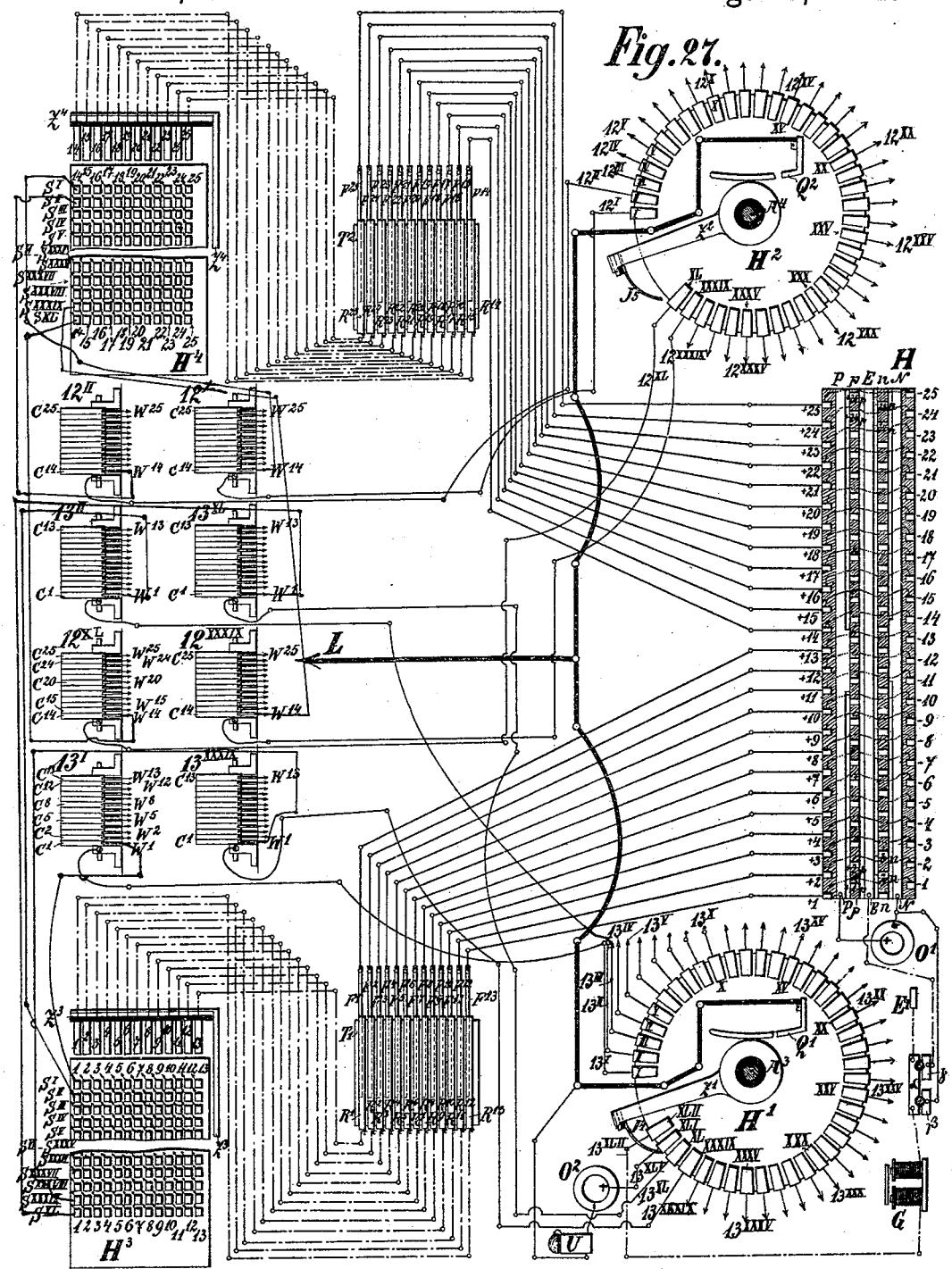

(No Model.) 9 Sheets—Sheet 9.

D. KUNHARDT.
AUTOMATIC TELEGRAPH.

No. 457,816. Patented Aug. 18, 1891.

Witnesses:
T. J. Coan.
A. Houghmans.

Inventor:
D. Kunhardt
by his attorneys
Roeder & Briesen

UNITED STATES PATENT OFFICE.

DAVID KUNHARDT, OF AACHEN, GERMANY.

AUTOMATIC TELEGRAPH.

SPECIFICATION forming part of Letters Patent No. 457,816, dated August 18, 1891.

Application filed September 23, 1890. Serial No. 365,912. (No model.)

*To all whom it may concern:*

Be it known that I, DAVID KUNHARDT, a subject of the King of Prussia, residing at Aachen, in the Kingdom of Prussia, German Empire, have invented certain new and useful Improvements in Automatic Telegraphs, of which the following is a specification.

This invention relates to improved apparatus for automatically sending telegrams to a receiving station or apparatus.

Figure 24:
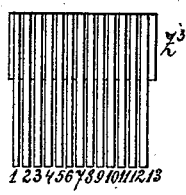
Figure 26:
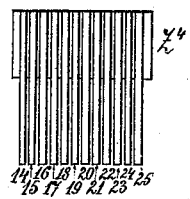
Figure 23:
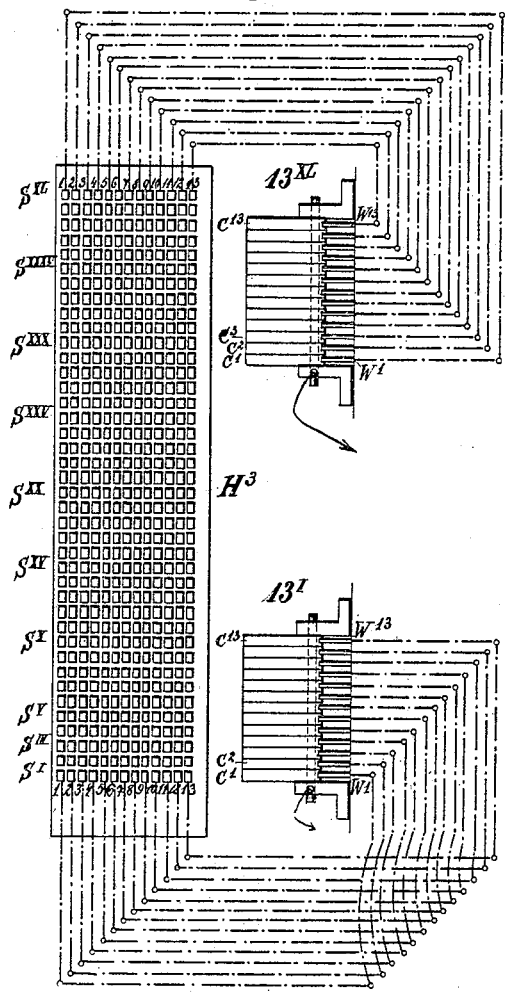
Figure 25:
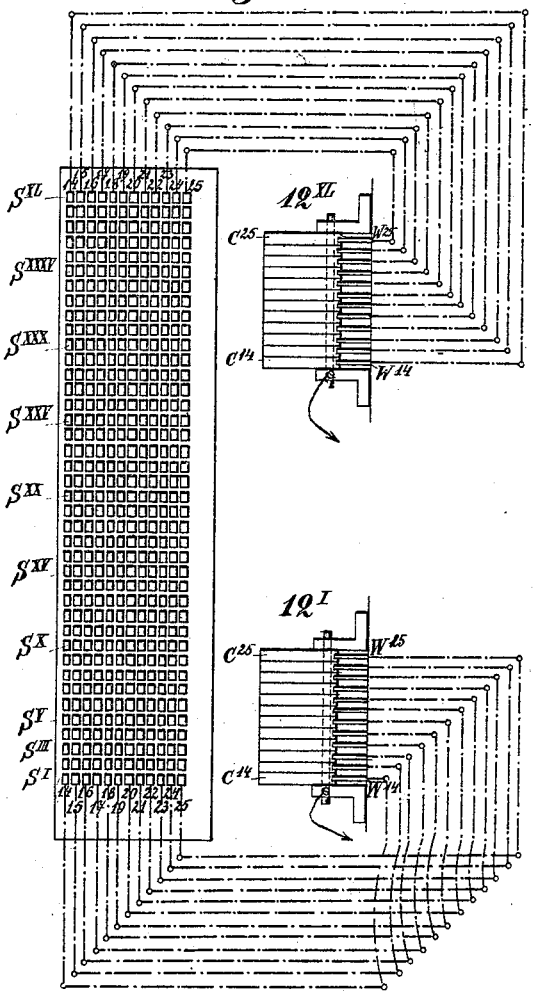
Figure 28:
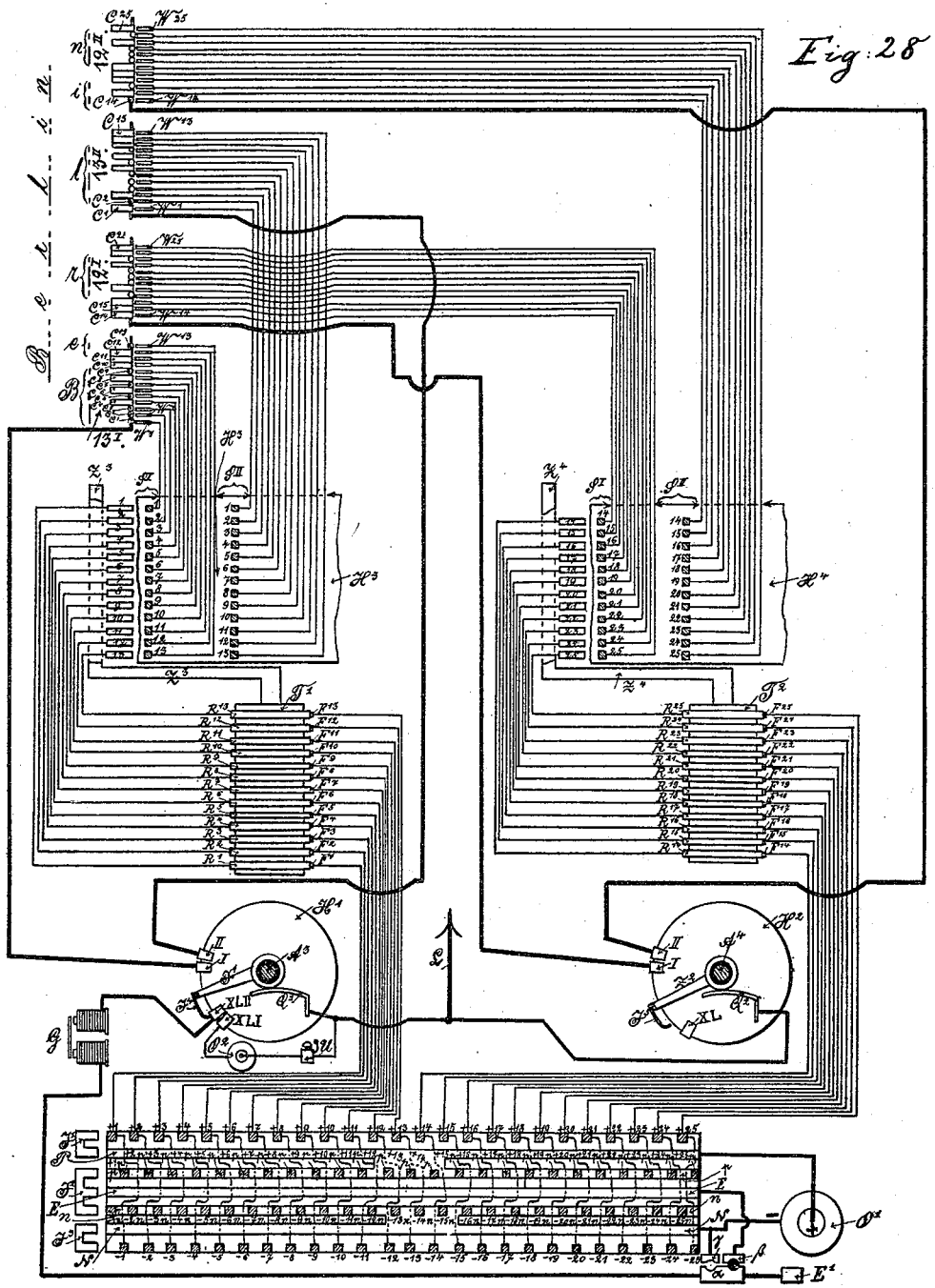

In the accompanying eight sheets of drawings, Figures 1 and 2 are respectively a side elevation and plan of the improved automatic telegraph of my invention. Figs. 3 and 4 are respectively a front and side elevation of the wheel or drum H. Figs. 5 and 6 are respectively a front and side elevation of the wheel or drum H'. Figs. 7 and 8 are respectively a front and side elevation of the wheel or drum $H^2$. Figs. 9, 10, and 11 are respectively a side and front elevation of a set of contact-cylinders. Fig. 12 is an end view of a set of cylinders with the cylinders in their lowest position to make contact. Fig. 13 is a front elevation of the wheel $H^3$ in connection with the wheel or drum T'. Fig. 14 is a side elevation of the wheel or drum T'. Fig. 15 is a side elevation of the wheel or drum $H^3$. Fig. 16 shows the wheel H evolved upon a plane surface. Figs. 17, 18, and 19 represent the set of contact-springs belonging to the said wheel H. Fig. 20 shows the wheel H' evolved upon a plane surface. Fig. 21 shows the wheel $H^2$ evolved upon a plane surface. Fig. 22 represents the contact-spring belonging thereto. Fig. 23 shows the wheel $H^3$ evolved upon a plane surface connected with the first and last set of contact-cylinders. Fig. 24 represents the contact-spring belonging thereto. Fig. 25 shows the wheel $H^4$ evolved upon a plane surface connected with the first and last set of contact-cylinders. Fig. 26 represents the contact-spring belonging thereto. Fig. 27 is a general plan or diagram of the whole apparatus. Fig. 28 is a plan showing the contacts for the word "Berlin."

A shaft A, Figs. 1 and 2, is supported in bearings provided in standards B' $B^2$ and susceptible of being turned by a handle K. Upon said shaft A an arm Z is mounted, the bent upper end of which carries contact-springs which, during the rotation of the said shaft A and arm Z, slide over the surface of a cylindrical wheel or drum H, of wood or other suitable material, rigidly held in position by a standard V. On the outside end of shaft A a toothed wheel 30 is mounted, gearing at the right and at the left hand side with toothed wheels $150^a$ and $150^b$, said wheels being, respectively, mounted on shafts A' and $A^2$, carried in bearings of suitable standards or frame sides M' $M^2$ and $M^3$ $M^4$. The toothed wheels $20^a$ and $20^b$ are respectively mounted on said shafts A' and $A^2$ and gear with the wheels $180^a$ and $180^b$, respectively carried by the shafts $A^3$ and $A^4$. The proportion of the gear-wheels is calculated in a manner to impart to the shafts $A^3$ and $A^4$, provided in bearings of the standards $B^3$ $B^4$, one revolution during the time in which the shaft A makes forty-five revolutions.

On the shaft $A^3$ an arm Z' is carried, and on the shaft $A^4$ a similar arm $Z^2$. Each of these arms has its upper end bent, and to the bent portion a contact-spring is secured, which spring has a sliding contact, respectively, with the circumference of the wooden wheel H', rigidly held in position by a standard V', and of a wooden wheel $H^2$, rigidly held by a standard $V^2$. On the shaft $A^3$ is, further, a cylinder or drum T', composed of thirteen rings R' to $R^{13}$, which in their rotation bear against thirteen corresponding springs F' to $F^{13}$; and on the said shaft $A^3$ is also mounted an arm $Z^3$, the bent upper end of which carries contact-springs, which during the rotation of said arm $Z^3$ have a sliding contact on the surface of the wooden wheel $H^3$, rigidly held in position by a standard $V^3$. On the shaft $A^4$ is mounted a wooden wheel $T^2$, composed of twelve rings $R^{14}$ to $R^{25}$, which in their rotation bear against twelve corresponding springs $F^{14}$ to $F^{25}$. On the same shaft $A^4$ is further mounted an arm $Z^4$, the upper bent end of which carries contact-springs, which during the rotation of said arm $Z^4$ have a sliding contact with the surface of the wooden wheel $H^4$, rigidly held in position by a standard $V^4$. Upon the cylindrical surface of the wheel or drum H, as shown in Figs. 3 and 4, fifty contact-blocks are arranged, the series of positive blocks $+1$ to $+25$ being on one side of the wheel, the series of negative blocks $-1$ to $-25$ on the other side. The positive and negative blocks are not in line, but alternately arranged, as clearly shown in Figs. 4, 16, and 27. Every positive block is connected to the negative block of the corresponding number by a conductive wire. As shown in Fig. 4, a central rail E and two double rails P$p$ and N$n$ are arranged between the two series of contact-blocks on the circumferential surface of the wheel, forming complete rings or circles around the same. The double rail P$p$ is connected to the positive pole of the battery O' and the double rail N$n$ to the negative pole of the same, the central rail E being connected to ground E'. Upon the rail $p$ of the double rail P$p$ a series of twenty-five contact-blocks $+1p$ to $+25p$ are arranged. The said blocks are placed on the same radius of the wheel with the contact-blocks $-1$ to $-25$. Upon the rail $n$ of the double rail N$n$ a corresponding series of twenty-five contact-blocks $-1n$ to $-25n$ are arranged, being placed on the same radius of the wheel with the contact-blocks $+1$ to $+25$. The bent portion of the arm Z on shaft A carries elastic springs $J'$ $J^2$ $J^3$, insulated from the arm by a rubber piece. When the shaft A is made to revolve, the spring $J'$ with one of its two fingers slides along the contact-blocks $+1$ to $+25$, and with the other finger makes contact with the part P of the double rail P$p$. The spring $J^2$ having three fingers slides with one finger along the rail $p$, with the central finger along the rail E, and with the third finger along the rail $n$. The rails $p$ and $n$ are brought into contact with said fingers only where the contact-blocks are projecting from said rails. The two-fingered spring $J^3$ is simultaneously making contact with the portion N of the rail N$n$ and with the series of negative contact-blocks $-1$ to $-25$, as clearly shown in Figs. 3 and 4, and also in Fig. 16, where the surface of wheel H is evolved upon a plane. The contacts made by the springs $J'$ $J^2$ $J^3$ while sliding over the contact-field of wheel H give rise to impulsions of alternate currents, the direction of the first impulsion being: positive pole P $J'$ $+1$ $F^{13}$ $R^{13}$ 1 1 $W'$ $C'$ I $Z'$ $Q'$ to line L, (independently of the latter, being connected to the positive or negative series of contact-blocks,) then returning through ground E', rail E, spring $J^2$ $-1n$ N to the negative pole. The second direction will be: positive pole P $1p$, $J^2$ E $\gamma$ $a$, earth E', and back over the line L $Q'$ $Z'$ I $C'$ $W'$ 1 1 $R^{13}$ $F^{13}$ $+1$ $-1$ $J^3$ N, negative pole. After this an impulsion will follow of the first direction, going to P $J'$ $+2$ line, ground E', rail E $J^2$ $-2n$ N, negative pole, and in succession a current of the second direction will pass by $+2p$, $J^2$ E E' L $-2$ $J^3$ N, negative pole, and so on.

The wheel or drum H', Figs. 5 and 6, is rigidly held in position by a standard V', and on its cylindrical surface said wheel carries a series of forty-two contact-blocks numbered from I to XLII, while the other wheel or drum H², rigidly held in position by a standard V², Figs. 7 and 8, carries on its cylindrical surface a series of forty contact-blocks numbered I to XL. The arms Z' Z² belonging to said wheels H' and H² are insulated upon their supporting-shafts A³ and A⁴ by a rubber hub or sleeve interposed. To the hub of arm Z' a sliding contact-spring Q' is provided to bear against said hub, and a similar spring Q² is provided to bear against the hub of arm Z². The upper bent portion of arm Z' carries the sliding contact-spring $J^4$, and a similar spring $J^5$ is carried by the upper portion of arm Z².

Figs. 20 and 21 represent, respectively, the wheels or drums H' and H², evolved upon a plane surface, and Fig. 22 is the contact-spring $J^4$ or $J^5$, sliding over the contact-blocks of the respective wheel. From each of the contact-blocks arranged on said wheels H' and H² a conducting-wire passes to one of the sets of cylinders, with exception of the contact-blocks XLI and XLII of wheel H', the latter two contacts being reserved for another purpose, as hereinafter described.

Of the sets of contact-cylinders, as shown in Figs. 9, 10, 11, and 12, forty sets are provided with thirteen cylinders each and forty with twelve cylinders each. To all sets of thirteen cylinders the wires are successively led from the contact-blocks of the wheel H'—for instance, to set $13^I$ the wire from contact I of wheel H', to set $13^{II}$ the wire from contact II of wheel H', &c., till set $13^{XL}$ receives the wire from contact-block XL of wheel H'. To all sets of twelve cylinders the wires are successively led from the contact-blocks of wheel H²—for instance, to set $12^I$ the wire leads from contact-block I of wheel H², to set $12^{II}$ the wire leads from contact-block II of wheel H², &c., till set $12^{XL}$ receives the wire from contact-blocks XL of wheel H². The angular supports W of all sets of cylinders are insulated from each other, and to all sets of thirteen supports the wires are successively led from the contact-blocks on the wheel H³—for instance, to set $13^I$ the wire leads from contact-block S' of wheel H³, to set $13^{II}$ the wire leads from contact-block S'' of wheel H³, &c., until the set $13^{XL}$ receives the wire from contact-block $S^{XL}$ of wheel H³. To all sets of twelve supports the wires are successively led from contact-blocks on the wheel H⁴—for instance, to set $12^I$ the wires lead from contact-block S' of wheel H⁴, to set $12^{II}$ the wire leads from contact-block S'' of wheel H⁴, &c., until the set $12^{XL}$ receives the wire from contact-block $S^{XL}$ of wheel H⁴.

The wheels or drums H³ H⁴ are hollow and rigidly held in position in their central portions by annular standards V³ and V⁴, respectively. Upon the cylindrical surface of wheel H³ forty series $S^I$ to $S^{XL}$ of thirteen contact-blocks are arranged in parallel rows, as shown in Fig. 13. The field of contact of this wheel is represented as evolved upon a plane surface in Fig. 23, in connection with the first and last set of cylinders. The wheel or drum H² carries on its cylindrical surface a similar arrangement of forty series $S^I$ to $S^{XL}$ of twelve contact-blocks each arranged in parallel rows. The field of contact of this wheel is represented in Fig. 25 as evolved upon a plane surface and in connection with the first and last set of cylinders belonging thereto.

The wire connection between each separate contact-block and the corresponding angular support or angle W is as follows: First, from the wheel $H^3$: from contact-block 1 of series $S^I$ a wire passes to angle $W'$ of set $13^I$, from contact-block 2 of series $S^I$ a wire passes to angle $W^2$ of set $13^I$, from contact-block 3 of series $S^I$ a wire passes to angle $W^3$ of set $13^I$, and so on till from contact-block 13 of series $S^I$ a wire passes to angle $W^{13}$ of set $13^I$, from contact-block 1 of series $S^{II}$ a wire passes to angle $W'$ of set $13^{II}$, from contact-block 2 of series $S^{II}$ a wire passes to angle $W^2$ of set $13^{II}$, from contact-block 3 of series $S^{II}$ a wire passes to angle $W^3$ of set $13^{II}$, and so on till from contact-block 13 of series $S^{II}$ a wire passes to angle $W^{13}$ of set $13^{II}$; finally, from contact-block 1 of series $S^{XL}$ a wire passes to angle $W'$ of set $13^{XL}$, from contact-block 2 of series $S^{XL}$ a wire passes to angle $W^2$ of set $13^{XL}$, from contact-block 3 of series $S^{XL}$ a wire passes to angle $W^3$ of set $13^{XL}$, and so on till from contact-block 13 of series $S^{XL}$ a wire passes to angle $W^{13}$ of set $13^{XL}$. Second, from the wheel $H^4$: from contact-block 14 of series $S^I$ a wire passes to angle $W^{14}$ of set $12^I$, from contact-block 15 of series $S^I$ a wire passes to angle $W^{15}$ of set $12^I$, from contact-block 16 of series $S^I$ a wire passes to angle $W^{16}$ of set $12^I$, and so on till from contact-block 25 of series $S^I$ a wire passes to angle $W^{25}$ of set $12^I$, from contact-block 14 of series $S^{II}$ a wire passes to angle $W^{14}$ of set $12^{II}$, from contact-block 15 of series $S^{II}$ a wire passes to angle $W^{15}$ of set $12^{II}$, from contact-block 16 of series $S^{II}$ a wire passes to angle $W^{16}$ of set $12^{II}$, and so on till from contact-block 25 of series $S^{II}$ a wire passes to angle $W^{25}$ of set $12^{II}$; finally, from contact-block 14 of series $S^{XL}$ a wire passes to angle $W^{14}$ of set $12^{XL}$, from contact-block 15 of series $S^{XL}$ a wire passes to angle $W^{15}$ of set $12^{XL}$, from contact-block 16 of series $S^{XL}$ a wire passes to angle $W^{16}$ of set $12^{XL}$, and so on till from contact-block 25 of series $S^{XL}$ a wire passes to angle $W^{25}$ of set $12^{XL}$.

In Fig. 13 the wheel or drum $H^3$ (same as $H^4$) is shown in connection with the wheel or drum $T'$ (same as $T^2$) mounted on the same shaft. The wheel $T'$ is secured to the common shaft $A^3$ by metal collars $m$ and carries on its cylindrical surface 13 metallic rings numbered $R'$ to $R^{13}$ and insulated from each other. The wheel $T^2$ carries twelve rings numbered $R^{14}$ to $R^{25}$, as shown in Figs. 1 and 2. Below the rings $R'$ to $R^{13}$ are arranged springs $F'$ to $F^{13}$, and below the rings $R^{14}$ to $R^{25}$ there are corresponding springs $F^{14}$ to $F^{25}$ in contact with their respective rings, as shown in Figs. 1 and 2. From each ring R a wire leads to the inside of the hollow wheel. All these wires lead, respectively, to the contact-springs 1 to 13 and 14 to 25, respectively, carried by an interposed insulation of the arms $Z^3$ and $Z^4$ arranged to slide, respectively, over the contact-field of wheel $H^3$ and $H^4$.

It has been mentioned before that the number of revolutions of the shaft A is so timed in proportion to the shafts $A^3$ and $A^4$ carrying the arms $Z'$ $Z^2$ that the latter complete one revolution when the shaft A completes forty-five turns. The arm $Z'$ of wheel $H'$ is so adjusted that its spring will slide from one contact-block of said block and make contact with the next at the time when the springs $J'$ $J^2$ $J^3$ of arm Z, Fig. 3, are resting on the contact-block $+21$ of wheel H. The spring of arm $Z'$ continues to slide in contact with the block of wheel $H'$, against which it actually rests, as springs $J'$ $J^2$ $J^3$ of the arm Z require in traveling the path S, indicated in Fig. 3—that is to say, till the fingers of said springs have arrived from contact-point $+21$ to $+18$ on the wheel H. Then follows a short pause, after which the spring of arm $Z'$ forthwith makes a sliding contact with the next contact-block of the series on wheel $H'$. The same play continues up to the contact-block XL of said wheel $H'$. The arm $Z^2$ with its spring is so adjusted relatively to the contact-blocks of wheel $H^2$ that the contact of the spring with every successive block of the series from I to XL begins at the moment when the fingers of the springs $J'$ $J^2$ $J^3$ are resting on the wheel H where the block $-8$ is in line with them. The arm $Z^2$ slides off the block of wheel $H^2$, against which it actually rests, when the springs $J'$ $J^2$ $J^3$ make contact with the block $-5$ of the wheel H. The arm $Z^2$, accordingly, continues in contact with each block of wheel $H^2$ as long as the springs $J'$ $J^2$ $J^3$ of arm Z are occupied in traveling the path S, indicated in Fig. 3. Analogous to the operation of arm $Z'$ over the surface of wheel $H'$ the arm $Z^3$ is carried over the forty contact-blocks $H^3$, and analogous to the operation of arm $Z^2$ on the wheel $H^2$ the arm $Z^4$ is carried over the surface of wheel $H^4$, making contact with the forty blocks of the same.

In carrying my invention into practice the wheels $H'$ and $H^2$, instead of being constructed as separate or independent parts of the apparatus, might as well be omitted. In this case the contact-blocks I to XLII of wheel $H'$ would be added as a fourteenth row of blocks to the thirteen rows contained on the cylindrical surface of the wheel $H^3$, and the contact-blocks I to XL, described as being carried by the wheel $H^2$, would be added as a thirteenth row of blocks to the twelve rows already contained on the surface of the drum or wheel $H^4$. Corresponding with such an additional row of contact-blocks both on the wheels $H^3$ and $H^4$, a fourteenth ring R and a fourteenth bearing-spring F (to replace the spring $Q'$) would have to be added to the wheel or drum $T'$, and also a thirteenth ring R and a thirteenth bearing-spring F (to replace the spring $Q^2$) to the wheel $T^2$. Likewise the arm $Z^3$ would receive a fourteenth spring, replacing $J^4$, and the arm $Z^4$ a thirteenth spring to replace the spring $J^5$. Each of these latter springs would be connected to its corresponding ring R like the rest, while the two springs replacing the springs $Q'$ and $Q^2$ would be connected to line.

As above described, alternate currents are generated from the contact-field of the wheel H and battery $O'$, as shown in Fig. 27. The first impulsion of alternate current proceeds from block $+1$ to spring $F^{13}$, through the ring $R^{13}$ to spring 1 of the arm $Z^3$, thence through the contact-block I of series $S^I$ to the angular support $W'$ below the set of cylinders $13^I$. Now, as all cylinders of the set $13^I$ are connected in circuit with that contact-block I of wheel $H'$ which at a given moment is connected to line L and spring $Q'$ of the arm $Z'$, making contact with said block I, it will be understood that as long as the sliding contact of arm $Z'$ with the said contact-block I continues, together with the simultaneous contact made by the springs 1 to 13 of the arm $Z^3$ with the row of thirteen contact-blocks of series $S'$, all those impulsions of current which arise from the blocks $+1$ to $+13$ of the wheel H may be utilized, the corresponding angle W of which within the set $13^I$ will be brought into contact with its cylinder C, arranged to swing above said angle. To telegraph the letter X, for example, the following cylinders $C'$ $C^2$ $C^3$ $C^5$ $C^7$ $C^9$ $C^{10}$ $C^{11}$ would have to be swung down into contact with their respective angles or supports $W'$ $W^2$ $W^3$ $W^5$ $W^7$ $W^9$ $W^{10}$ $W^{11}$. The result would be the character .... ..., which by means of the attraction of the armature in the receiver would be contracted into —..—. When by the continued rotation of the shaft A and arm Z the springs $J'$ $J^2$ $J^3$ are brought into contact with the block $+14$, the current from this moment will pass over the spring $F^{14}$, the ring $R^{14}$, the spring 14 of arm $Z^4$, through the contact-block 1 of series $S^I$ of the wheel $H^4$, and to the angle $W^{14}$, below the set of cylinders $12^I$. If the cylinder $C^{14}$ of said angle $W^{14}$ is in contact with the same, the current will pass to the contact-block 1 of wheel $H^2$, through the arm $Z^2$ and spring $Q^2$, to the line. Accordingly all impulsions from the blocks $+14$ to $+25$ may be utilized by swinging down the cylinders of set $12^I$ into contact with their respective angle W. During the continued rotation of the shaft A, as before described, the shaft $A^3$ has been carried along so far that the arm $Z'$ passes over from block I to the contact-block II of the wheel $H'$. The same forward movement is imparted to the arm $Z^3$ on wheel $H^3$, which simultaneously slides over to the series $S^{II}$ of contact-blocks. From this moment all impulsions arising from the contacts $+1$ to $+13$ may pass through the springs $F'$ to $F^{13}$, the rings $R'$ to $R^{13}$, the springs 1 to 13 of arm $Z^3$, and through the contact-blocks 1 to 13 of series $S^{II}$, and said impulsions may be utilized by swinging down into contact with their respective angles W the cylinders C of the set $13^{II}$. The same play continues exactly in the manner described until the contact-block XL of wheel $H'$ enters into connection with series $S^{XL}$ of wheel $H^3$ and with the set of cylinders $13^{XL}$. During the continued rotation of shafts A the arm $Z^2$ on wheel $H^2$ has equally proceeded to the contact-block II of said wheel, and simultaneously the arm $Z^4$ of wheel $H^4$ has proceeded to series $S^{II}$ (from 14 to 25) in such a manner that by swinging down the cylinders of set $12^{II}$ into contact with their angles W the impulsions arising from the contact-blocks $+14$ to $+25$ may be utilized. Finally, the contact-blocks XL of wheel $H^2$ are working in connection with series $S^{XL}$ of the wheel $H^4$ and the set of cylinders $12^{XL}$. Then follows a pause of five contact-blocks for the wheel $H^2$, while by the wheel $H'$ a bell U is made to sound, said bell being actuated by closing the local circuit of a battery $O^2$, the said circuit being closed through block $XL^I$ and arm $Z'$ to indicate the termination of the revolutions. Above the contact $XL^{II}$ of wheel $H'$ a relay G is arranged in connection with the receiving-station, Fig. 27. If stoppering be applied between the connecting parts $\alpha$ $\beta$, continuous currents are produced; but if stoppering be applied at $\alpha$ $\gamma$ alternating currents will arise.

A telegram may be forwarded by the use of my improved apparatus in successively swinging down the cylinders, according to the rule, of the sets $13^I$ $12^I$ $13^{II}$ $12^{II}$ $13^{III}$ $12^{III}$ $13^{IV}$ $12^{IV}$, and so on, until $13^{XL}$ $12^{XL}$. Each cylinder swung down into contact with its supporting-angle W will produce a point of the Morse alphabet. Three consecutive points will produce a dash. The pause between every two primary elements of a character are produced by omitting one cylinder, the pause between two characters by omitting three cylinders, and the pause between two words by omitting six consecutive cylinders. It is evident that on turning shaft A the wheel or cylinder H is touched by the three springs $J'$ $J^2$ $J^3$. If this is done forty-five times, the arms $z'$ $z^2$, drums $T'$ $T^2$, and the arms $z^3$ $z^4$ are turned once. The pointer $z$ lies in rest on the contact-piece XLII of the wheel $H'$ and can now receive signs over relays G by line L, spring $Q'$, arm $z'$, spring $J^4$, relays G, block $a$, and earth $E'$. For the purpose of giving signs—for example, a dispatch beginning with the word "Berlin"—it is laid down on the squares beneath the cylinders of the sets $13^I$ $12^I$ $13^{II}$ $12^{II}$, &c., up to the sets $13^{XL}$ and $12^{XL}$, in case the dispatch is so long. For each point is laid down one cylinder and for each dash are laid down three cylinders, the necessary intervals being made by leaving standing cylinders. In dispatching the word "Berlin" the pointer $Z'$ lies on the block I of the drum $H'$. The pointer $Z^2$ is still distant from the block I of the drum $H^2$. The pointer $Z^3$ lies with its springs 1 to 13 on the row $S^I$ 1 to 13 of the drum $H^3$. The pointer $Z^4$ is with its springs 14 25 still distant from the row $S^I$ 14 to 25 of the drum $H^4$. The spring $J'$ slides on the elevation $+1$ and the bar P. The spring $J^2$ slides on the elevation $-1n$ and on the bar E. The bar $p$ itself is not touched, but only the elevations on the same, $(+1p +2p +3p,$ &c.;) nor is the bar $n$ touched, but only the elevations of the same $(-1n -2n -3n,$ &c.) when dispatching alternate currents. The spring $J^3$ slides on the bar N. Laid down are the cylinders $C'$ $C^2$ $C^3$ $C^5$ $C^7$ $C^9$ $C^{13}$ in set $13^I$, $C^{17}$ $C^{19}$ $C^{20}$ $C^{21}$ $C^{23}$ in set $12^I$, $C^2$ $C^4$ $C^5$ $C^6$ $C^8$ $C^{10}$ in set $13^{II}$, and $C^{14}$ $C^{16}$ $C^{20}$ $C^{21}$ $C^{22}$ $C^{24}$ in set $12^{II}$. The current runs from +pole of the battery $O'$ to the bar P, the contact-piece $+1$, the slide-spring $F^{13}$, the ring $R^{13}$ of the drum $T'$, the spring 1 of the pointer $Z^3$, the contact-piece 1 in row $S^I$ of the drum $H^3$, the square $W'$, the cylinder $C'$ of the complex $13^I$, the contact-piece I of the drum $H'$, the pointer $Z'$, the spring $Q'$ in line L, back over the earth $E'$, contact-block $a$ $\gamma$, bar E, spring $J^2$, elevation $-1n$, bar $n$, bar N, to $-$ pole of the battery $O'$. In this way the first point is given. The dash of the letter B is represented by three points, which flow together to a dash when the receiver is put up for this purpose. Thereafter follows the alternate current from the positive pole of the battery $O'$ over bar P, contact-piece $+1p$, bar E $\gamma$ $a$, to earth $E'$, back over the line L, spring $Q'$, pointer $Z'$, contact-piece I of the drum $H'$, cylinder $C'$, square $W'$ of the set $13^I$, contact-piece 1 in row $S^I$ of the drum $H^3$, spring 1 of pointer $Z^3$, ring $R^{13}$ of drum $T'$, spring $F^{13}$, contact-piece $+1$, over the connecting-wire to contact-piece $-1$ of drum H, spring $J^3$, bar N, and to the negative pole of the battery $O'$. The second point (middle part of the dash) is dispatched over the positive pole of the battery $O'$, bar P, spring $J'$, contact-piece $+2$, spring $F^{12}$, ring $R^{12}$, spring 2, contact-piece 2, square $W^2$, cylinder $C^2$, contact-block II of drum $H'$, pointer $Z'$, spring $Q'$, and line L, back over earth $E'$, blocks $a$ $\gamma$, bar E, spring $J^2$, elevation $-2n$, bar N, and negative pole of battery $O'$. The corresponding alternate current goes from the positive pole of the battery $O'$ to the bar P $+2p$, spring $J^2$, bar E, plugs $\gamma$ $a$, earth $E'$, back over line L, spring $Q'$, pointer $Z'$, block II, cylinder $C^2$, square $W^2$, spring 2, contact-piece 2, ring $R^{12}$, spring $F^{12}$, contact-piece $+2$ to contact-piece $-2$ of the drum H, spring $J^3$, bar N, to the negative pole of the battery $O'$. The third point (end of the dash) is dispatched from the positive pole of the battery $O'$ over bar P, spring $J'$, contact-piece $+3$, spring $F^{11}$, ring $R^{11}$, spring 3, contact-block 3, square $W^3$, cylinder $C^3$, block III of drum $H'$, pointer $Z'$, spring $Q'$, line L, back over earth $E'$, plugs $a$ $\gamma$, bar E, spring $J^2$, elevation $-3n$, bar N, and negative pole of the battery $O'$. The corresponding alternate current goes from the positive pole of the battery $O'$ to the bar P $+3p$, spring $J^2$, bar E, plugs $\gamma$ $a$, earth $E'$, back over line L, spring $Q'$, pointer $Z'$, block III, cylinder $C^3$, square $W^3$, contact-piece 3, spring 3, ring $R^3$, spring $F^3$, contact-piece $+3$ to contact-piece $-3$, spring $J^3$, bar N, to the negative pole of the battery $O'$, and the first dash $(-)$ is dispatched. An impulse of the current over the positive pole of the battery $O'$, bar P, spring $J'$, contact-piece $+4$, &c., cannot be dispatched, because an interruption takes place at the square $W^4$ and cylinder $C^4$. Over square $W^5$ and cylinder $C^5$ there can now again be dispatched a current, besides the following alternate current dispatched over $W^7$ $C^7$ $W^9$ $C^9$ $W^{13}$ $C^{13}$, thus giving the three points of the letter B and the letter $e$. In the meanwhile the pointer $Z^2$ has arrived on the piece I of the drum $H^2$, and by sliding the springs $J'$ $J^2$ $J^3$ on the contact-pieces $+14$ to the contact-pieces $+25$ all these currents and alternate currents in line can be dispatched by laying down the cylinders in the set $12^I$ over pointer $Z^2$ and I of the drum $H^2$ to produce the letter $r$. By sliding the springs $J'$ $J^2$ $J^3$ over the contact-pieces $+14$ to $+25$ the pointer $Z'$ slides off from piece I of drum $H'$ and slides immediately on piece II, while the pointer $Z^3$ slides off from the row $S^I$ 1 to 13 of drum $H^3$ and immediately slides on the row $S^{II}$ 1 to 13. As soon as the springs $J'$ $J^2$ $J^3$ are again on the contact-piece $+1$ all these currents go in the line, which can be dispatched by laying down the cylinders in the set $13^{II}$ over pointer $Z'$ and piece II of drum $H'$ to produce the letter $l$. While this has happened the pointer $Z^2$ slides off from block I of drum $H^2$ and slides on block II, while the pointer $Z^4$ slides off from row $S^I$ 14 to 25 of drum $H^4$ and slides on row $S^{II}$ 14 to 25. Thus with the springs $J'$ $J^2$ $J^3$ the currents over the cylinders laid down in the set $12^{II}$ and over the pointer $Z^2$ and block II of the drum $H^2$ are dispatched in the line L. It is evident that thereafter the intervals between the single sets are formed on mechanical grounds, and that these intervals have no influence on the regular groups of the letter elementary signs, but that the word "Berlin" is grouped on the paper strip exactly according to direction given in the represented Morse word "Berlin" above the sets. This is done by two revolutions of the springs $J'$ $J^2$ $J^3$ around the drum H with the contact pieces $+1$ $+2 +3 +5 +7 +9$ for set $13^I$, $+17$ $+19$ $+20$ $+21$ $+23$ for set $12^I$, $+2$ $+4$ $+5$ $+6$ $+8$ $+10$ for set $13^{II}$, and $+14$ $+16$ $+20$ $+21$ $+22$ $+24$ for set $12^{II}$. Thus the word "Berlin" is dispatched by two revolutions of the springs $J'$ $J^2$ $J^3$ around the drum H. The further dispatching of the telegram takes place over the laid-down cylinders in the sets $13^{III}$ $12^{III}$ $13^{IV}$ $12^{IV}$, &c., to the set $13^{XL}$ and $12^{XL}$ by the sliding of the pointers $Z'$ and $Z^2$ over the points I to XL of the drums $H'$ and $H^2$, and by the sliding of the springs $J'$ $J^2$ $J^3$ over the contact-pieces $+1$ to $+25$ of the drum H. A bell U is brought in action over the contact-piece XLI of drum $H'$ by pointer $Z'$ through the battery $O^2$ to give a signal that the dispatch is ended and that the pointers $Z'$ and $Z^2$ have made forty revolutions.

Having now particularly described and ascertained the nature of my said invention and in what manner the same is to be performed, I declare that what I claim is—

An improved automatic telegraph apparatus comprising a contact-field composed of two series of contact-blocks $+1$ to $+25$ and $-1$ to $-25$, the rails $Pp$, $E$, and $Nn$, all arranged on the cylindrical surface of a wheel or drum $H$, over which passes an arm $Z$, with sliding contact-springs $J'$ $J^2$ $J^3$ to produce alternating currents generated by the connection with a battery $O'$, which currents are guided through bearing-springs $F$, rings $R$, contact-springs 1 to 13 and 14 to 25, respectively, carried by arms $Z^3$ and $Z^4$ to the series $S$ of contact-blocks on the wheels $H^3$ and $H^4$, thence to the angular supports $W$, connected to the line, whereby the said currents may be utilized by making contact between said angular supports $W$ and a metallic cylinder $C$ belonging to each of them, said cylinders being divided into sets permanently connected to the contact-pieces on the wheels $H'$ and $H^2$ and temporarily connected to line by the sliding contacts of the arms $Z'$ and $Z^2$ and the springs $Q'$ and $Q^2$, substantially as and for the purpose set forth.

In testimony whereof I hereunto sign my name, in the presence of two subscribing witnesses, this 19th day of July, 1890.

DAVID KUNHARDT.

Witnesses:
 JOHN HECKMANNS,
 ARNOLD KOLP.